United States Patent [19]

Teramachi

[11] Patent Number: 4,475,776
[45] Date of Patent: Oct. 9, 1984

[54] LINEAR SLIDE BEARING

[76] Inventor: Hiroshi Teramachi, 34-8, Higashi-Tamagawa 2-chome, Setagaya-ku, Tokyo 158, Japan

[21] Appl. No.: 476,144

[22] Filed: Mar. 17, 1983

[30] Foreign Application Priority Data

Mar. 19, 1982 [JP] Japan ................................. 57-42583

[51] Int. Cl.³ ........................ F16C 29/06; F16C 29/04
[52] U.S. Cl. .................................... 308/6 C; 308/6 R
[58] Field of Search ............... 308/6 C, 6 R, 3 A, 3 R

[56] References Cited

U.S. PATENT DOCUMENTS 4,253,709  3/1981  Teramachi ........................... 308/6 C
4,296,974 10/1981  Teramachi ........................... 308/6 C
4,348,064  9/1982  Teramachi ........................... 308/6 C
4,417,771 11/1983  Teramachi ........................... 308/6 C

FOREIGN PATENT DOCUMENTS 1107085  8/1955  France ................................. 308/6 C Primary Examiner—Stuart S. Levy
Assistant Examiner—Thomas R. Hannon
Attorney, Agent, or Firm—Armstrong, Nikaido, Marmelstein & Kubovcik

[57] ABSTRACT

The linear slide bearing comprising: a slide table formed into the shape of letter "C"; a pair of bearing races fitted into the recesses formed on the inner side of each arm of the slide table; a fixing member being drawn up by a bolt passing through the central portion of the slide table to fix the pair of bearing races in their positions; a guide rail fitted into the space defined by the pair of bearing races fixed to the slide table and by the fixing member; a pair of guide covers mounted to the front and rear ends of the slide table; and a number of balls running through endless tracks, the endless tracks being formed by no load ball guide grooves formed in the slide table and the bearing races, by guide grooves formed in the guide covers, by load ball grooves formed in the bearing races and by ball-running grooves formed in the guide rail. The linear slide bearing with the above construction can be manufactured at low cost and when formed with light material it is suited for high speed reciprocating movement.

4 Claims, 8 Drawing Figures

LINEAR SLIDE BEARING

BACKGROUND OF THE INVENTION

The present invention relates to a linear slide bearing. In the sliding portions of the numerical controlled machine tools and industrial robots, linear slide bearings are used to linearly guide the sliding members.

In the coventional linear slide bearing of this type (as is known in the U.S. Pat. Nos. 4,296,974, 4,253,709 and 4,348,064), the bearing races, functioning as the moving table carrier member, are each fixed to the arms of the slide table on which the sliding member is mounted. Each bearing race is formed with a no-load ball returning through-hole which constitute a part of the endless ball track.

However, the linear slide bearings with the above construction requires the no-load ball returning holes to be cut through the bearing races. This adds to the complexity of machining and it is therefore difficult to manufacture the bearing with low cost. Further, since the bearing races are each fixed to the arms of the slide table by screws, they must be mounted separately requiring many processes. The bearing races also requires mounting holes to be cut. Moreover, since the bearing needs quenching, there is a possibility of the mounting holes being cracked during the quenching process.

SUMMARY OF THE INVENTION

The present invention has been accomplished to overcome the aforementioned drawbacks experienced with the conventional linear slide bearing.

In other words, the primary object of this invention is to provide a linear slide bearing that can be manufactured at low cost, comprising: a slide table formed into the shape of letter "C"; a pair of bearing races fitted into the recesses formed on the inner side of each arm of the slide table; a fixing member being drawn up by a bolt passing through the central portion of the slide table to fix the pair of bearing races in their positions; a guide rail fitted into the space defined by the pair of bearing races fixed to the slide table and by the fixing member; a pair of guide covers mounted to the front and rear ends of the slide table; and a number of balls running through endless tracks, the endless tracks being formed by no-load ball guide grooves formed in the slide table and bearing races, by guide grooves formed in the guide covers, by load ball grooves formed in the bearing races and by ball-running grooves formed in the guide rail.

The second object of this invention is to provide a linear slide bearing which is made best suited for the high speed reciprocal movement by forming the slide table with light material.

The third object of this invention is to provide a linear slide bearing in which the guide rail is formed at lower portion with inclined surfaces so that it can easily be mounted to the bed.

DESCRIPTION OF THE PREFERRED EMBODIMENT

Figure 1:
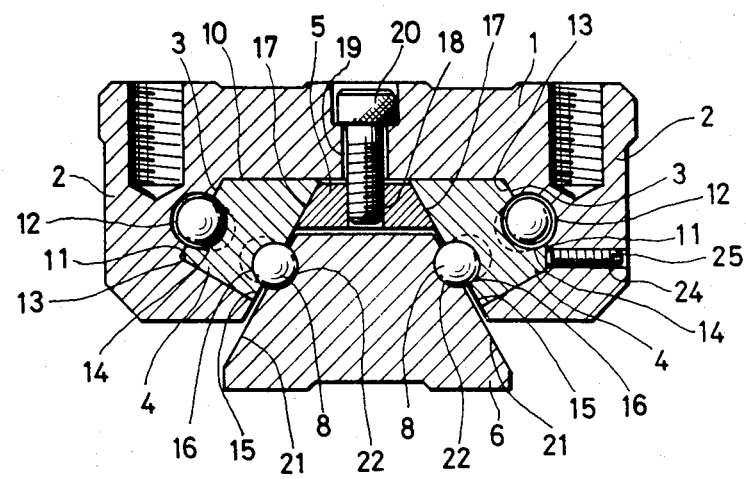
FIG. 1 is a cross section of the linear slide bearing of this invention.
Figure 2:
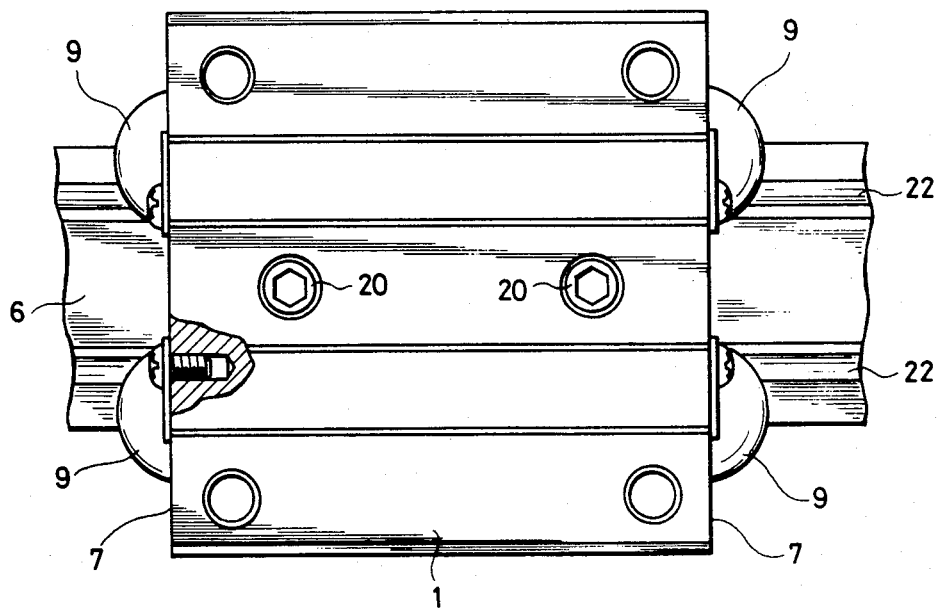
FIG. 2 is a plan view of the bearing.
Figure 3:
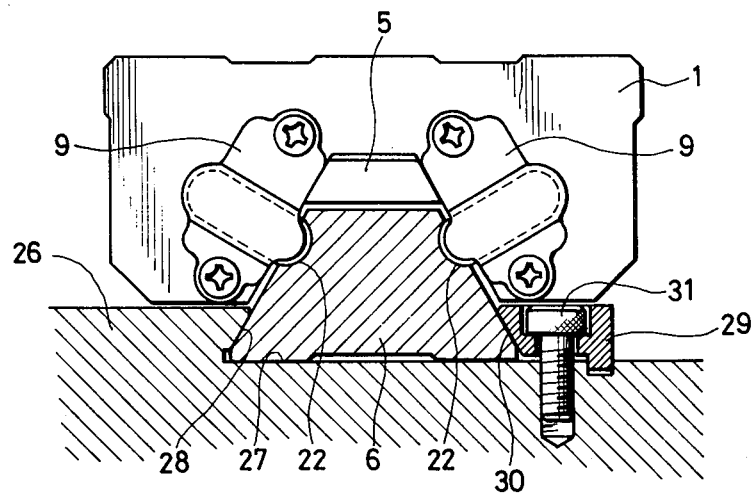
FIG. 3 is a front view of the bearing.

Referring to FIGS. 1 through 3, the linear slide bearing consists of: a slide table 1 on which to mount a member (not shown) to be carried; a pair of bearing races 4, 4 fitted in the recesses 3, 3 formed in both arms 2 of the slide table 1; a fixing member 5 to secure the pair of bearing races 4, 4 to the recesses 3, 3 of the slide table 1; a guide rail 6 to guide the slide table 1 linearly; and guide covers 9,9 mounted to the front and rear end surfaces 7, 7 of the slide table 1 to form a part of the endless track of the balls 8.

First the structure of the slide table 1 is explained in the following. The slide table 1 may be formed of aluminum extrusion product as described later or formed of molded synthetic resin. It is formed, as shown in FIG. 1, into the shape of letter "C" lying on its side. That is, the slide table 1 has a horizontal surface 10 on the inner central surface and also has inclined surfaces 11, 11 at the inner upper portion of the recesses 3, 3 of the arms 2. A no-load ball guide groove 12 is formed in each inclined surface 11.

A pair of bearing races 4, 4 are fitted into the recesses 3, 3 of the slide table 1. The mating surfaces 13, 13 of the bearing races 4, 4 in contact with the inclined surfaces 11, 11 of the recesses 3, 3 have no-load ball guide grooves 14, 14 formed therein. The no-load ball guide grooves 12, 12 on the slide table 1 and the no-load ball guide grooves 14, 14 on the bearing races 4, 4 form holes along the direction of the slide table movement in which the balls are contained and which form a part of the endless track. On the surface 15 of the bearing race 4 opposite to the surface 13 a load ball groove 16 is formed.

The fixing member 5 is formed trapezoidal in cross section having inclined surfaces 17, 17 in pressure contact with the inclined mating surfaces 15, 15 of the bearing races 4, 4. The fixing member 5 has screw holes 18, 18 at the central portion in longitudinal direction with a certain space between them. By screwing bolts 20, 20 through the holes 19, 19 of the slide table 1 into the screw holes 18, 18, the fixing member 5 is secured to the slide table 1 thereby fixing the pair of bearing races 4, 4 at one time to the recesses 3, 3 of the slide table 1. That is, as the bolt 20 is tightened, the fixing member 5 is drawn up toward the horizontal surface 10 of the central portion of the slide table 1 gradually pressing the inclined surfaces 17, 17 of the fixing member 5 against the inclined surfaces 15, 15 of the bearing races 4, 4.

Engaged in the trapezoidal space formed by the fixing member 5 and the bearing races 4, 4 is a guide rail 6 which is also formed trapezoidal in cross section. The guide rail 6 has ball-rotating grooves 22, 22 on the inclined surfaces 21, 21 facing the inclined surfaces 15, 15 of the bearing races 4, 4. The load ball grooves 16, 16 on the inclined surfaces 15, 15 of the bearing races 4, 4 and the ball-rotating grooves 22, 22 on the inclined surfaces 21, 21 of the guide rail 6 form a part of the endless ball track. This part of the endless ball track, unlike the aforementioned part of the endless track, constitute the passage through which the balls 8 sustaining the load are running.

The load ball grooves 16, 16 and the ball-rotating grooves 22, 22, these constituting the part of the endless track which carries the load, have a depth almost equal to the radius of the ball 8 in order to minimize the gap between the bearing races 4, 4 and the guide rail 6. In this embodiment the inclined surfaces 21, 21 are exteneded down to the lower part of the guide rail. This function is detailed later.

Figure 4:
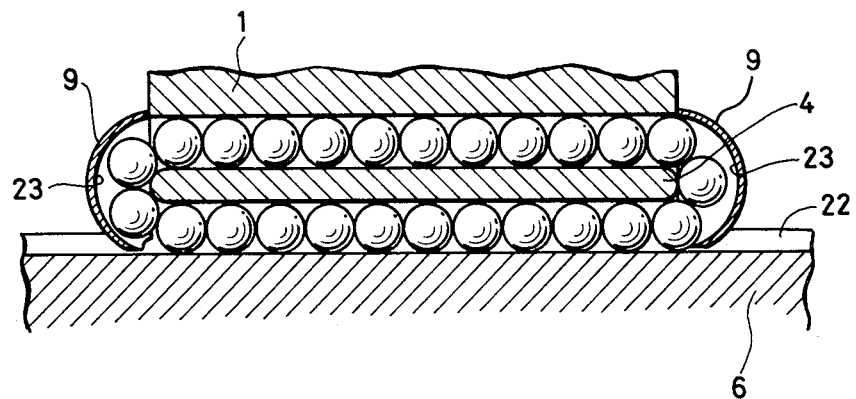
FIG. 4 is a cross-sectional view showing a number of balls placed in the endless track.

On the front and rear end surfaces 7, 7 of the slide table 1 are formed guide covers 9, 9, as shown in FIGS. 2 and 3, which have guide grooves 23, 23 as shown in FIG. 4. The guide grooves 23, 23 are formed by connecting both ends of the no-load ball guide grooves 12, 12 and 14, 14, the load ball grooves 16, 16 and the ball-rotating grooves 22, 22 as shown in FIG. 4 so as to form the endless ball track in which a plurality of balls are placed so that they can move freely. In this embodiment four guide covers 9 are used, each pair being provided to the front and rear end, and these covers 9 are formed by the pressing machine.

As shown in FIG. 1, one of the arms 2 of the slide table 1 is formed with a screw hole 24 into which a screw 25 is screwed. This works as a preloading mechanism. The screw 25 is tightened to apply load in lateral direction to the balls 8 running through the the load ball grooves 16, 16 and the ball-rotating grooves 22, 22.

Now, the structure of the lower portion of the guide rail 6 is described here. In this embodiment, the inclined surfaces 21, 21 are extended down to the lower portion of the rail 6 to provide the following advantages. When mounting the guide rail 6 on the bed 26 as shown in FIG. 3, one of the extended inclined surfaces 21, 21 is placed against the inclined surface 28 of the bed 26 at the step 27 and the other inclined surface 21 is placed in pressure contact with the inclined surface 30 of a fixing member 29. And the fixing member 29 is secured by bolt 31 to the bed 26 thereby firmly securing the guide rail 6 on the bed 26.

The above structure has the following advantages. It is not necessary to cut a through hole in the pair of bearing races 4, 4 (which serve as a load-bearing member) and instead the no-load ball guide grooves 14, 14 semicircular in cross section have only to be formed on the surfaces 13, 13. These semicircular grooves can easily be formed. It is also possible to improve machining accuracy by quenching the bearing races 4 and then cutting the grooves in them. Further since the pair of bearing races 4, 4 are not fixed separately by screws but simultaneously secured to the recesses 3, 3 of the slide table 1 by a single fixing member 5, the mounting procedure is very simple. This embodiment requires no tap machining for making mounting holes, so that there is no possibility of cracks occurring in the quenching process. Since the no-load ball guide grooves 14, 14 and the load ball grooves 16, 16 can easily be machined with high accuracy, the grooves when the bearing races are fixed can easily be set in the correct position with high accuracy.

The no-load ball guide grooves 12, 12 of semicircular cross section are formed on the inner surface of the slide table 1. These guide grooves can be formed easily when forming the slide table 1 by extrusion molding. By reducing the weight of the slide table 1, it is possible to reduce the inertia thereby improving the starting speed of the table. In other words, the time required for the slide table to reach the predetermined speed can be reduced. This advantage is characteristic of the linear slide bearing.

In addition, since no holding device is used, the depth of the load ball grooves 16, 16 and the ball-rotating grooves 22, 22 is set large. Therefore the bearing can sustain large radial load. It also can support the reverse radial loal (upward load).

The ball-rotating grooves 22, 22 of the guide rail 6 can of course be cut when machining the external shape of the guide table 6. As shown in FIG. 3, the guide rail is firmly secured by the fixing member 29, so it is not necessary to form mounting holes in the guide rail 6. This helps reduce the machining cost. By utilizing the inclined surfaces 21, 21 of the guide rail 6, it is possible to mount the guide rail true to the base surface of the bed 26 with ease. Further, if the guide covers 9, 9 are formed by pressure molding, the cost of manufacture can be reduced.

The preloading mechanism provided to the above embodiment applies a certain degree of pressure to the balls. This gives a rigidity and increase the life of the bearing thus ensuring the smooth linear guiding for a long period of time.

Figure 5:
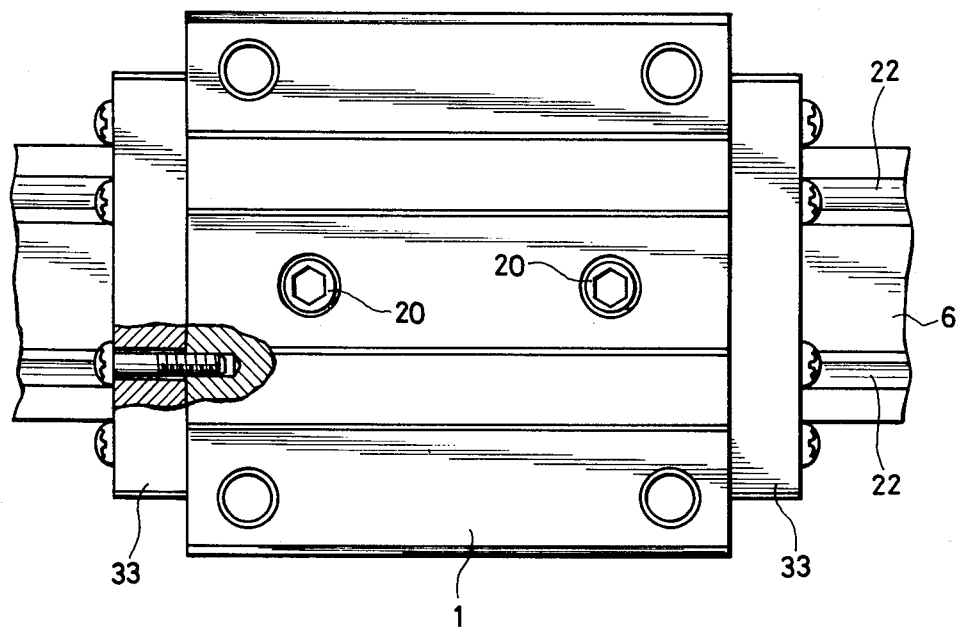
FIG. 5 is a plan view of another embodiment of this invention.
Figure 6:
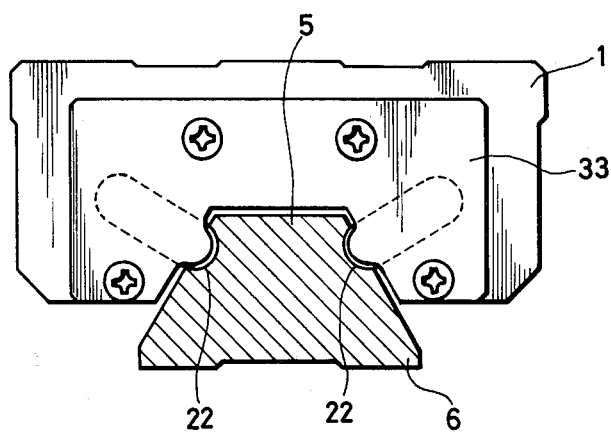
FIG. 6 is a front view of the second embodiment.
Figure 7:
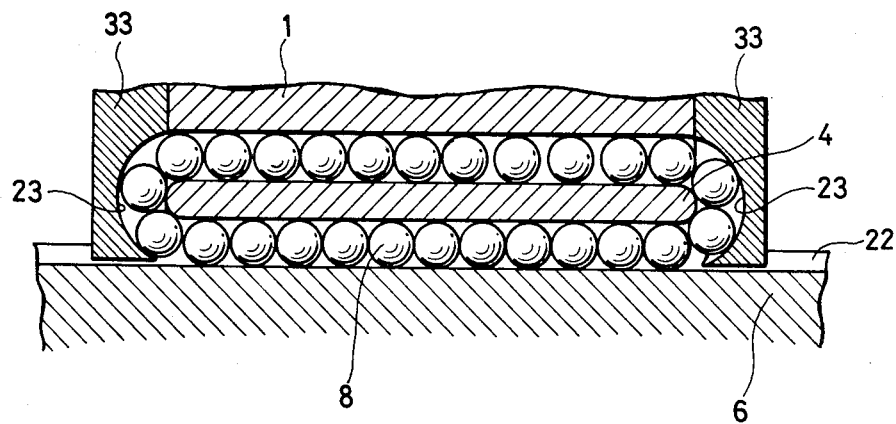
FIG. 7 is a cross-sectional view showing a number of balls placed in the endless track.

FIGS. 5 through 7 show another embodiment of this invention, these figures corresponding to the preceding FIGS. 2 through 4. The components alike to those in FIGS. 2 through 4 are asigned with like reference numbers and their explantions are omitted here.

As shown in FIGS. 5 and 6, a guide cover 33 is mounted to the front and rear end of the slide table 1 to form a part of the endless track. The guide covers 33, 33 are formed either by aluminum die casting, precision casting or synthetic resin molding and this structure helps reduce the parts count.

Figure 8:
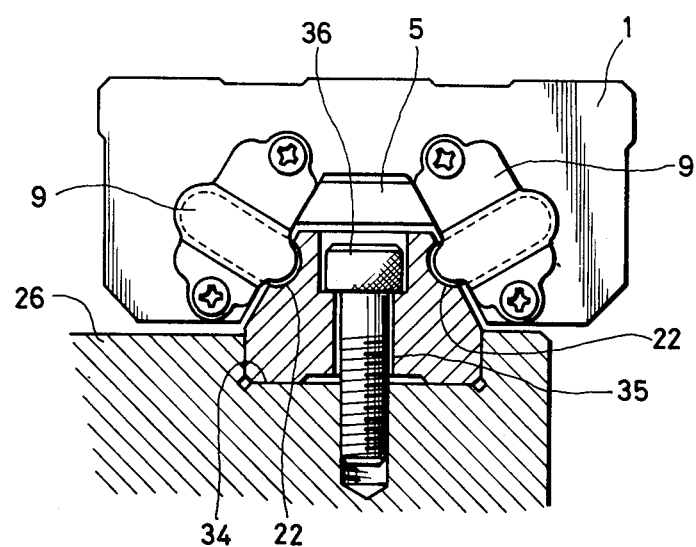
FIG. 8 is a partial cross-sectional view showing other example of the bearing mounted on the guide rail.

FIG. 8 shows other example of mounting the guide rail 6 to the bed. In this example, a recess 34 is formed in the bed 26 and the lower part of the guide rail 6 is formed into rectangular in cross section so that it fits into the recess 34. The guide rail 6 is formed with a hole 35 through which a bolt 36 is passed and screwed into the bed 26.

The structure of this invention may be summarized as follows.

It consists mainly of: a slide table, formed into the shape of a letter "C" in cross section, the slide table having a recess, the recess being defined by a horizontal surface at the central inner side of the slide table and inclined surfaces of the upper inner side of the arms, the slide table having no-load ball guide grooves formed in the inclined surfaces; a pair of bearing races fitted into the recesses, the bearing races having a no-load ball guide groove formed in the surfaces facing the inclined surface of the slide table and a load ball groove formed in the opposite surfaces; a fixing member trapezoidal in cross section having inclined surfaces in pressure contact with those inclined surfaces of the bearing races having the load ball grooves, the fixing member being drawn upward by a bolt which passes through the slide table and screwing into the screw hole formed in the fixing member, the inclined surfaces of the fixing member being pressed against the inclined surfaces of the bearing races as the bolt is tightened, thereby securing the the bearing races in the recesses of the slide table; a guide rail trapezoidal in the upper cross section fitted into the space formed by the fixing member and the bearing races, the guide rail having a ball-rotating groove in the inclined surfaces facing the bearing race inclined surfaces; and guide covers having a guide groove and mounted to the front and rear ends of the slide table to connect both ends of the no-load ball guide grooves, load ball grooves and ball-rotating grooves to form endless ball tracks.

This construction brings about the following advantages.

The endless ball tracks can be formed without cutting the through hole in the bearing races. That is, the above construction does not require conventional no-load ball returning holes. Therefore, the pair of bearing races can easily be fixed to the slide table and there is no possibility of the bearing races cracking during quenching process. The simple structure brings down the manufacturing cost. Moreover, the weight of the bearing body can be reduced to increase the speed of the movement.

What is claimed is:

1. A linear slide bearing comprising: a slide table, formed into the shape of a letter "C" in cross section having a central inner side and a pair of arms, the slide table having a horizontal surface at the central inner side of the slide table and recesses formed on inner sides of the arms, the recesses having inclined surfaces on an upper part of the arms, the slide table having no-load ball guide grooves formed in the inclined surfaces; a pair of bearing races fitted into the recesses, the bearing races having no-load ball guide grooves formed in surfaces facing the inclined surface of the slide table and load ball grooves formed in opposite surfaces; a fixing member trapezoidal in cross section having inclined surfaces in pressure contact with inclined surfaces of the bearing races having the load ball grooves, the fixing member having screw holes formed at a central portion at certain intervals in a longitudinal direction, the fixing member being drawn upward by a bolt which passes through a central portion of the slide table and screwing into the screw hole formed in the fixing member, the inclined surfaces of the fixing member being pressed against the inclined surfaces of the bearing races as the bolt is tightened, thereby securing the bearing races in the recesses of the slide table; a guide rail trapezoidal in cross section fitted into a space formed by the fixing member and the bearing races, the guide rail having a ball-rotating groove in the inclined surfaces facing the bearing race inclined surfaces; guide covers having a guide groove and mounted to front and rear ends of the slide table to connect both ends of the no-load ball guide grooves, load ball grooves and ball-rotating grooves to form endless ball tracks; and a number of balls placed in the endless tracks.

2. A linear slide bearing as defined in claim 1, wherein the slide table is formed of aluminum extrusion molded material, aluminum casting or molded synthetic resin product.

3. A linear slide bearing as defined in claim 1, wherein the slide table has a preloading mechanism which comprises a screw hole formed in one of the arms of the slide table and a screw, the screw being tightened to tighten the bearing races thereby giving a preload to the bearing.

4. A linear slide bearing as defined in claim 1, wherein the guide rail has inclined surfaces extending down to the lower portion and is secured to a bed by pressing one of the inclined surfaces against an inclined surface of a step of the bed and by pushing an inclined surface of a fixing member against the other inclined surface of the guide rail.

* * * * *